UNITED STATES PATENT OFFICE.

JOHN TUNBRIDGE, OF NEWARK, NEW JERSEY.

PROCESS FOR RECOVERING PRECIOUS METALS FROM LIQUIDS IN WHICH THEY ARE SUSPENDED.

SPECIFICATION forming part of Letters Patent No. 228,004, dated May 25, 1880.

Application filed November 4, 1879.

*To all whom it may concern:*

Be it known that I, JOHN TUNBRIDGE, of Newark, in the county of Essex and State of New Jersey, have invented a new and Improved Process of Recovering Precious Metals from Liquids in which they are Held Suspended, of which the following is a specification.

I have found that metal suspended in water or other liquid, such as jewelers' and miners' waste waters, &c., when brought in contact with saponule, which is an imperfect soap, or with saponine, saponaria, or with saponified oils and fats of any kind, forms in the act of coagulation a concrete substance. The method employed to effect this purpose when treating metals or alloys that are suspended in water consists in first depriving the water of as much of the earthy non-metallic matter as possible. This is effected by any of the ordinary methods in use for that purpose, such as letting it stand until the earthy matter precipitates.

A small stream or dilute solution of the saponified oils or fats is mingled with the water containing the metals in suspension. The saponified oil or fat is preferably prepared by dissolving about one pound of any suitable soap or saponule in about thirty-five gallons of water. These proportions will be sufficient for one hundred tons of the water holding gold or other metal in suspension; but they may be varied to suit the dissimilar nature of the water holding metal in suspension as found in different localities.

When the saponified oil or fat above described is brought in contact with water holding metal in suspension the soapy matter will immediately coagulate (provided the water is hard or saline) and take up the metal in the water or solution, and form together therewith an agglomeration of metal and soap. In case the water holding metals in suspension is soft and alkaline, so that it will not coagulate soap, an addition of a salt or of an acid is necessary to facilitate the formation of a coagulum. In that case roasted sulphate of lime, in egg size or thereabout, is exposed to the flow of such water, in which case the uncurdled metallic emulsion containing the soap and passing over such sulphate of lime will at once be coagulated. Any other method, however, of insuring the requisite proportion of alkaline salts or acid, and the consequent coagulation of the soapy matter and formation of the agglomerate of metal and soap, may be employed.

The coagulum or agglomerate of metal and soap is next separated by partially filling a barrel or barrels, tank, or any suitable vessel with vegetable or other fiber—such as wood shavings, sawdust, straw, grass, husks, or the like—and passing the water that contains the agglomerate through the filter thus formed, whereby the fatty coagulum is caused to adhere to the filter, while the water passes through. When this fiber or filter is sufficiently charged with the agglomerate it is, together with the matter adhering thereto, dried and burned, and the metal then obtained from the ashes by melting in a crucible or by any of the ordinary analogous processes.

I desire it to be clearly understood that whenever I use the term "metal" or "metals" in this specification I intend to include alloys.

I claim—

The process of separating metals from jewelers' wastes, mining-waters, &c., by treating said wastes with soapy solutions and subsequent filtration, substantially as specified.

JOHN TUNBRIDGE.

Witnesses:
   A. V. BRIESEN,
   JOHN C. TUNBRIDGE.